(12) United States Patent
Apel et al.

(10) Patent No.: US 6,927,566 B2
(45) Date of Patent: Aug. 9, 2005

(54) DEVICE FOR GENERATING OUTPUT VOLTAGES

(75) Inventors: Peter Apel, Suedkirchen (DE); Klaus Wilczek, Werne (DE)

(73) Assignee: AB Eletronik GmbH, Werne (DE)

( * ) Notice: Subject to any disclaimer, the term of this patent is extended or adjusted under 35 U.S.C. 154(b) by 155 days.

(21) Appl. No.: 10/392,735

(22) Filed: Mar. 19, 2003

(65) Prior Publication Data

US 2003/0218840 A1 Nov. 27, 2003

(30) Foreign Application Priority Data

May 22, 2002 (DE) .......................................... 102 22 468
May 22, 2002 (DE) .......................................... 102 22 467

(51) Int. Cl.⁷ ................................................. G01B 7/00
(52) U.S. Cl. .................................. 324/207.21; 324/174
(58) Field of Search .......... 324/207.13, 207.18–207.19, 324/207.2, 207.21, 207.22–207.26, 173, 174, 252; 323/368, 365; 338/32 R; 360/313, 324

(56) References Cited

U.S. PATENT DOCUMENTS

| | | | | |
|---|---|---|---|---|
| 5,744,950 A | * | 4/1998 | Seefeldt ...................... | 324/166 |
| 6,154,025 A | * | 11/2000 | Schelter et al. ......... | 324/207.21 |
| 6,640,652 B2 | * | 11/2003 | Kikuchi et al. ......... | 73/862.333 |

FOREIGN PATENT DOCUMENTS

| | | |
|---|---|---|
| DE | 36 39 208 A1 | 5/1988 |
| DE | 38 20 475 C1 | 12/1989 |
| DE | 40 04 085 A1 | 8/1991 |
| DE | 197 16 985 | 10/1998 |
| DE | 199 03 490 C2 | 8/2000 |
| EP | 0 4577033 B1 | 11/1991 |
| EP | 1 024 267 A2 | 8/2000 |
| EP | 1 046 021 A1 | 10/2000 |
| EP | 1 046 022 A1 | 10/2000 |
| EP | 1 089 056 A1 | 4/2001 |
| WO | WO 95 14911 A | 11/1994 |
| WO | WO 98 22781 | 11/1997 |
| WO | WO 98 25102 | 12/1997 |
| WO | WO 00 29815 | 10/1999 |

OTHER PUBLICATIONS

Philips Semiconductors, General Part 2, Nov. 1994, p. 141–143.

* cited by examiner

*Primary Examiner*—Bot LeDynh
(74) *Attorney, Agent, or Firm*—Milde & Hoffberg, LLP

(57) ABSTRACT

The invention relates to a device and a method for the contact-free measurement of rotary and/or linear movements of components moving in relation to one another; and a device for the contact-free measurement of rotary and/or linear movements of components moving in relation to one another utilizing a Giant Magnetic Resistor (GMR) cell and at least one magnetic element, and an evaluation unit, in which two delivery voltages with mirror-image profiles are generated by the magnet element, moved in relation to said GMR cell.

10 Claims, 17 Drawing Sheets

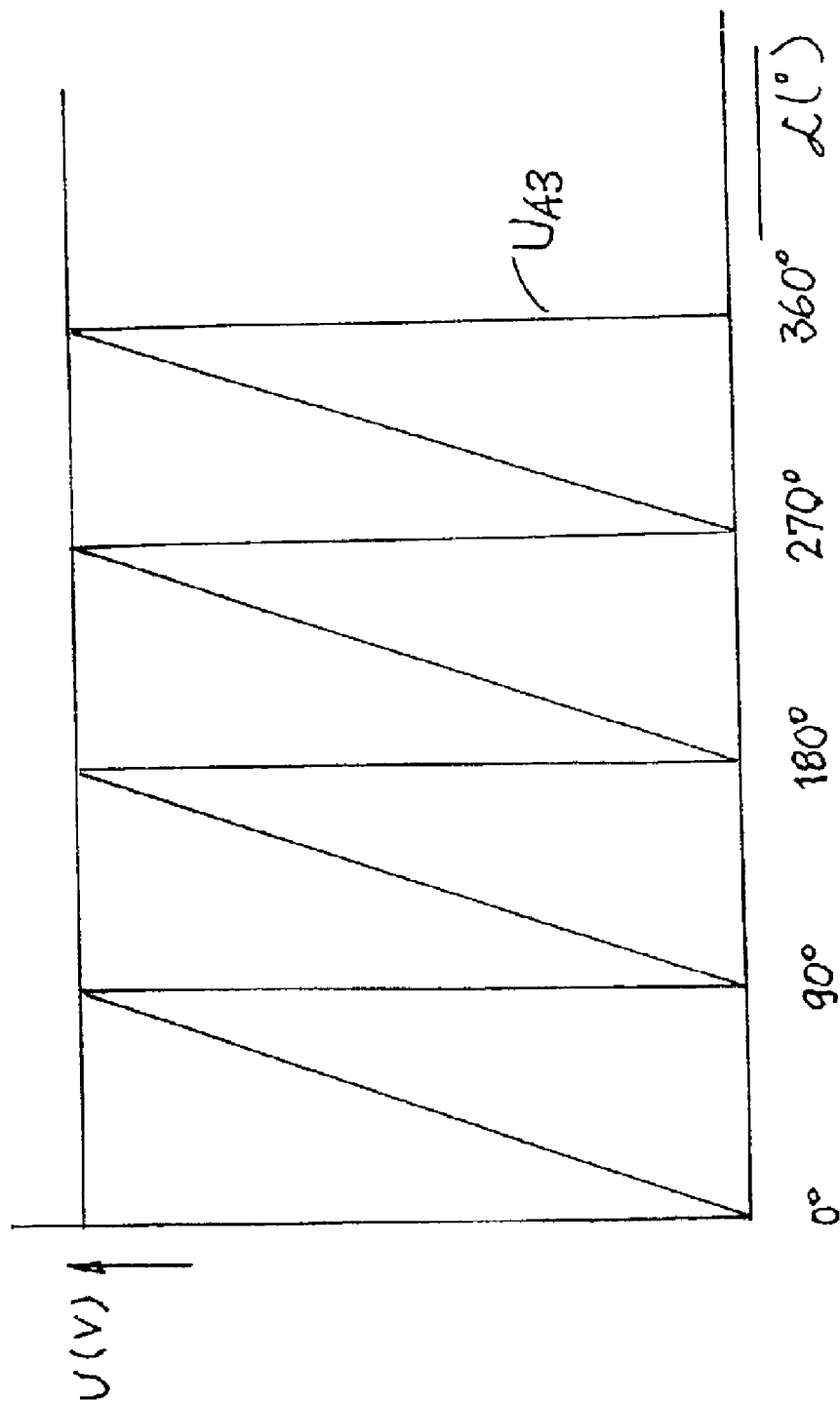

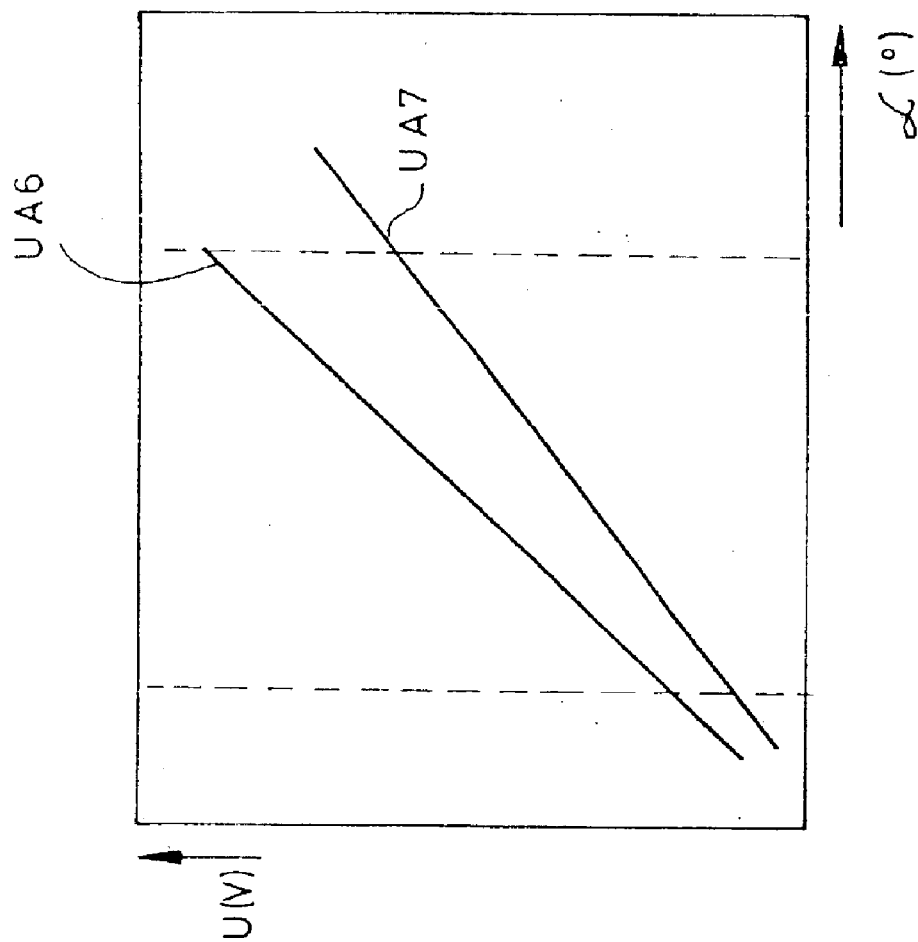

DEVICE FOR GENERATING OUTPUT VOLTAGES

FIELD OF THE INVENTION

The invention relates to a device for generating output voltages that represent the position of components that are moving relative to one another, using a) at least one Giant Magnetic Resistor (GMR) resistor, with one magnetic element moving relative to said GMR cell in at least one gap, whereby the GMR resistor is located in at least one resistor network, and b) an evaluation unit.

In the device, the Giant Magnetic Resistor (GMR) resistor, in which two delivery voltages with mirror-image profiles are generated by a magnetic element that is moved in relation to said GMR cell, permits the contact-free measurement of rotary and/or linear movements of components moving in relation to one another, and the contact-free measurement of rotary and/or linear movements of components moving in relation to one another, utilizing a Giant Magnetic Resistor (GMR) cell.

BACKGROUND OF THE INVENTION

Rotary movements are measured with rotation angle sensors. A rotation angle sensor that supplies an output voltage which corresponding to the assumed rotary angle is known from WO 95 14 911 A. It consists of a stationary formation and of a rotating formation. The stationary formation includes two semi-circular shaped stator elements with a spacing opening between them and a Hall element located in said opening. The rotating formation exhibits a magnet element designed in a ring shape, which is supported by a support element and can be moved around the stator element while maintaining an air gap.

Such a rotation angle sensor is also known to the applicant from WO 98 25 102 A1, DE 197 16 985 A1, DE 199 03 490 A1 or EP 1 024 267 A2.

These embodiments of the rotation angle sensor have proven themselves. However, they require accurate adjustments. One adjustment option of the output values for the known sensors is presented in WO 98 22 781 A1. The advantage of this adjustment is that the output values can be adjusted to output voltages when the sensor is already encapsulated. In addition, the adjustments can be repeated any number of times.

A device for determining the position of rotating shafts is known from DE 197 16 985 A1. The Hall voltage generated by the movement of the rotor through the Hall IC elements that are located in two adjacent air gaps is provided to an evaluation unit, which generates from it an output voltage, where an output signal is assigned to each position angle between 0° and 360°.

The measurement of the degree of actuation of damper flaps or accelerator pedals is also possible using sensors according to the resistance method.

The use of a dual potentiometer for this purpose that provides output voltages of differing slopes is known from EP 0 457 033 B1.

Its disadvantage is that the resistance values change due to the operating temperatures that occur in the motor compartment, which leads to inaccurate readings.

It is known from DE 40 04 085 A1 to generate two output curves with slopes in opposite directions corresponding to the position change of the damper flap or the accelerator pedal using a dual potentiometer.

However, the required error indications cannot be carried out with the output curves due to the significantly fluctuating resistance values caused by the high operating temperatures in the motor compartment.

DE 38 20 475 C1 discloses a magnetic field sensor with a thin ferro-magnetic layer, and associated current and voltage contacts for reading out magnetically stored data. Adjacent ferro-magnetic layers are provided via an interim layer. Said ferromagnetic layers are made of materials that, without the contribution of an outer magnetic field, the magnetization of the one ferro-magnetic layer is oriented anti-parallel to the abutting or adjacent ferro-magnetic layer. The interim layer is made of a non-magnetic metal. With the known magnetic field sensor, the changes of the magnetic resistance, and thus the measurement signal, should be greater than with the magnetic field sensors known thus far. The solution for this is that the interim layer exhibits a thickness that is below the mean free path of the electrons.

A magnetic sensor for providing electric signals is known from DE 36 39 208 A1. As described therein, several resistors arranged at 90° to one another are located on a substrate. The sensor is moved relative to a permanent magnet in the homogenous magnetic field of the latter.

A device with a motion transducer element that includes a Wheatstone bridge containing two magnet-sensitive half bridges is known from EP 1 089 056 A1. It provides a simple determination of the direction of rotation of the motion transducer element.

A linear sensor operating according to the magneto-resistive principle, using a bridge circuit, as well is known from EP 1 046 021 A1 and EP 1 046 022 A1.

A rotation angle measuring device with a magneto-resistive sensor is known from Philips Semiconductors, General part 2, November 1994, P. 141–143. It can measure angles of up to 90°. However, the output voltage is susceptible to temperature changes.

Giant Magnetic Resistor (GMR) cells are also known. If these cells are exposed to a magnetic field, they deliver two delivery voltages that are positioned in a V-shape to one another. However, the GMR cells are used only as switches or as reader heads for hard disks.

SUMMARY OF THE INVENTION

The present invention includes a method for the contact-free measurement of rotary or linear movements of components moving in relation to one another; a device for the contact-free measurement of rotary or linear movements of components that move relative to one another; and a device for generating output voltages, which represent the position of components that are moving relative to one another According to the method for the contact-free measurement of rotary or linear movements of components moving in relation to one another, at least one Giant Magnetic Resistor (GMR) cell is provided, and assigned to one component; and a magnetic element is provided, and assigned to the other component, and two delivery voltages (U1, U2), with mirror-image profiles, are generated from the GMR as the magnet element is moved relative to the GMR. Then, an output voltage that captures the relative motion of the magnet element with respect to the GMR, in generated from at least one of the two delivery voltages, and the movement of the components relative to one another is measured from the output voltage generated.

In the method of the present invention, at least one of the delivery voltages is straightened, and the two delivery voltages may be logically linked to one another. For instance, the delivery voltages may be placed on top of each other in a crossed manner. One or both of the two output voltages (U1, U2) of a GMR cell may be output as output voltage.

According to the device for the contact-free measurement of rotary or linear movements of components that move relative to one another of the present invention, a stationary part and a rotating part, are arranged such that they can move in relation to one another while maintaining a gap distance. In a preferred embodiment of the invention, the stationary part is at least one Giant Magnetic Resistor (GMR) cell, and the rotating part is at least one magnet element.

In a preferred embodiment of this device, two GMR cells are provided, and arranged at an equal angle to one another. The two GMR cells may be positioned successively, or above one another.

In a device for generating output voltages according to the present invention, at least two GMR cells are arranged at an equal angle to one another, and a 360° logic unit comprises the evaluation circuit. In another preferred embodiment, at least one GMR cell is connected to a logic unit, serving as an evaluation unit, and, the values of two output voltages generated by the GMR cell are logically linked to a linearized first output voltage through the logic unit. In this embodiment, the slope of the first output voltage can be changed through the logic unit.

According to another embodiment of the device of the present invention, a first GMR cell is located in the diagonal branch of a first Wheatstone bridge and a second GMR cell is located in the diagonal branch of a second Wheatstone bridge of a bridge logic unit serving as an evaluation unit. The values of one output voltage of the first GMR cell and the values of the one output voltage of the second GMR cell are logically linked to a second sinus-curve-shaped second output voltage using the bridge logic unit.

In this embodiment, the terminals of the first and second Wheatstone bridges may be connected via connection elements to the inputs of a first and a second amplification element, and to the inputs of a multi-amplification element. In addition, the output of the first and the second amplification elements, and the multi-amplification element, may be connected to a first AND gate and to a second, AND gate via NOR gates; and the output of the first and the second AND gates connected to a first flip-flop, which is connected to an output terminal. The output of the first AND gate and the output of the amplification elements may be connected to a second flip-flop.

According to another preferred embodiment of this device at least two GMR cells are connected to a 360° logic unit serving as an evaluation unit, and the 360° logic unit receives the two delivery voltages that are output by each GMR cell, assigns a position angle (á) to each delivery voltage value, computes the actual position angle (á) from 0 to 360° from the delivery voltages that are assigned to the position angle (á) and outputs said position angle as a third output voltage. This method and construction may be used with four GMR cells, connected to the 360° logic unit.

According to another embodiment of the present invention, at least one GMR cell is connected to at least one PIN adjustment unit serving as an evaluation unit, and adjustment data, selected from the group consisting of course bits (GSC), offset bits, FB, and fine bits, are stored temporarily in a temporary memory via an output pin OUT and a modification unit. Modified output voltages with slopes in opposite directions are output to an operation unit via a delivery device, and the adjustment data written to a permanent memory by the modification unit when the fourth and the fifth output voltage have reached their adjustment position.

A PIN adjustment unit may be used as an evaluation unit, and the adjustment data stored temporarily in a temporary memory via an output pin OUT and a modification unit. A sixth and a seventh output voltage may be output to an operation unit via a delivery device. The output voltages may be essentially linear between two extreme points and exhibit a deviating slope, whereby the adjustment data are then written to a permanent memory by the modification unit when the sixth and the seventh output voltage have reached their adjustment position.

In the device of the present application, one PIN adjustment unit may be assigned to each GMR cell, or two GMR cells connected to a PIN adjustment unit, when the GMR cells are designed with one common voltage supply.

It is an object of the invention to provide a device for generating output voltages that easily and accurately regenerates the desired output voltages and allows them to be used for the desired application.

It is a further object of the invention to provide a device for measuring rotary and linear movements that are simple in design and accurate in measurement.

The advantages achieved with the invention arise from using GMR cells as components of the rotation angle sensor that generates greater utilizable signals. The delivery voltages are up to 80 to 90% linear. Only the last part of the curve is slightly curved.

Additionally, the device for generating output voltages has a very small area size: only 4 mm$^2$. The moveable part, the magnet element, no longer requires an accurate adjustment. It only needs to be positioned appropriately opposite the GMR cell. In addition, the two part sensor is not sensitive to impact, dirt, humidity, temperature and the like.

A GMR voltage that is output by two delivery voltages with an essentially V-shaped profile is generated by the currents that flow in opposite directions. In this manner, it is possible to utilize two steep areas with different slopes for the measurements.

The delivery voltages can be evaluated in various ways. For example, at least one delivery voltage may be straightened at least partially. Since the delivery voltage has an essentially linear shape, this section can already be used. If a large angle range is to be measured, the identified section may be used proportionally as well.

Through the logic operation of the two delivery voltages, it is possible to create the desired slope and the desired shape of one delivery voltage.

However through respective shifting, it is also possible to place both the delivery voltages crosswise on top of one another. This allows for the generation of output voltages with different slope profiles.

It is possible to utilize only one of the two delivery voltages of only one GMR cell as the output voltage. However, it is equally possible to use both for one output voltage.

One of the two delivery voltages of at least two GMR resistors with a resistor network can be supplied as the output voltage. In this manner, it is possible to measure an angle from 0 to 360° in its entirety.

It is furthermore possible to use the two delivery voltages of at least two GMR resistors with a resistor network for the regeneration of an output signal. In this manner, it is possible to reduce the number of employed GMR cells due to their dual utilization.

The advantages achieved with the invention arise in particular from the provision of a new generation of rotation angle sensors. Due to the use of the giant effect for measuring the rotation and angle movements, it is possible to measure these movements very precisely and accurately. This new sensor is also capable of withstanding the very extreme conditions of the motor compartment, as it is not sensitive to temperature, dirt and humidity.

At least two GMR cells can be arranged at the same angle to one another. This angle can be between 1° and 359°. The angle to be utilized depends on the respective requirements.

Four GMR cells that may be arranged at angles of 90° to one another may also be used. This allows for the position-accurate measurement of the rotary movement of the magnet element from 0 to 360°.

An additional GMR cell can be assigned to each GMR cell. In this manner it is possible to set up redundant systems or dual measurement systems.

The two GMR cells may be arranged in any desired position to one another, i.e., they may be arranged successively, above one another or next to one another.

The magnet element may be arranged in one plane with the GMR cells. This means that the magnet element can rotate either in front of, below or above the GMR cells.

In addition to the GMR resistor that changes corresponding to the existing magnetic field, the resistor network contains at least one more resistor.

One design option for the resistor network is a voltage divider that consists of a series circuit of a resistor with a fixed resistance and a GMR resistor with a changeable resistance with a tap for the output voltage located between the two in a known manner. This design is the simplest implementation for generating an output voltage.

Another design option for the resistor network is a Wheatstone bridge that can be positioned or arranged by itself or together with additional Wheatsone bridges. As part of the Wheatstone bridge, one the bride resistors is designed as an adjustable GMR resistor. Based on its changeable resistance value, the adjustable resistor generates the respective output profile.

At least one of the GMR cells with a resistor network is connected to an evaluation circuit. This evaluation circuit can be designed in a manner appropriate to the respective requirements. It may be—a logic unit, a logic bridge unit, a 360° logic unit, or a pin adjustment unit.

Proven and known circuits used herein generate the required and necessary output signals exactly. In this manner it is possible to employ the GMR rotation angle sensor in place of a known rotation angle sensor without major modifications. It is of no concern whether the known sensor operates according to the Hall or the resistance method. It is also possible to replace the known simple rotation angle sensors according to the magneto-resistive method with the higher-grade GMR rotation angle sensors.

The advantages achieved with the output voltage generating device of the invention consist primarily in that the delivery voltages supplied by the at least one GMR cell during the movement of the magnet element are converted to one or more output voltages by the special evaluation unit where said output voltages can be used for the varying applications. The very useable delivery voltages can be converted to output voltages that can be utilized and evaluated very well.

In this manner, it is possible to detect the positions of rotating elements of motor vehicles, to monitor components or entire systems, and to monitor the monitoring device itself, in order to detect the occurrence of errors in the fastest way possible and to be able to correct them.

For a full understanding of the present invention, reference should now be made to the following detailed description of the preferred embodiments of the invention as illustrated in the accompanying drawings.

BRIEF DESCRIPTION OF THE DRAWINGS

FIG. 10b shows an output voltage that is supplied by a logic unit according to FIG. 10a.

FIG. 12b and c show output voltages that are supplied by a 360° logic unit according to FIG. 12a.

FIG. 17c shows the delivery voltages adjusted by the PIN adjustment unit according to FIGS. 13 to 16 in relation to additional output voltages.

DESCRIPTION OF THE PREFERRED EMBODIMENTS

Figure 1:
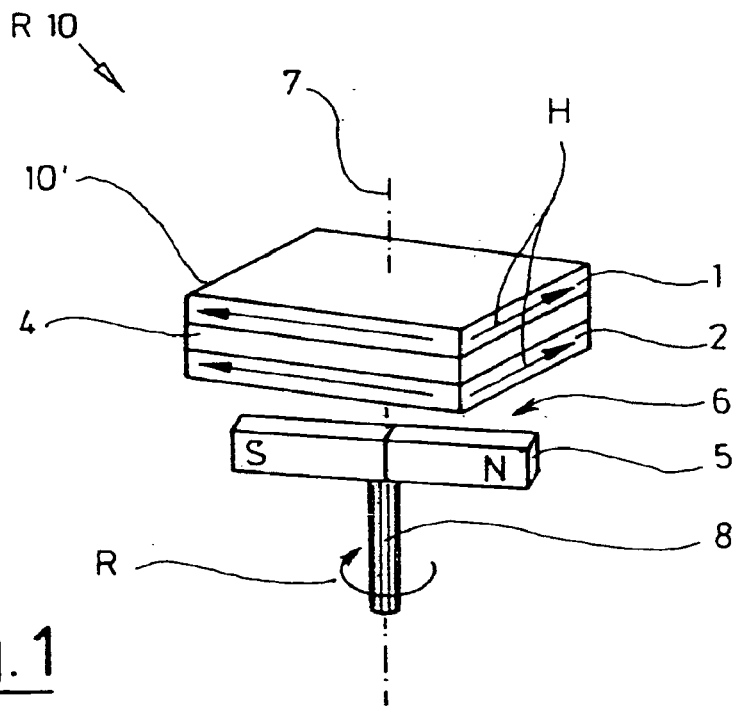
FIG. 1 shows a schematic, perspective view of a GMR resistor of a GMR rotation angle sensor.

FIG. 1 shows a GMR resistor R10. It consists of a stationary unit that is formed by a Giant Magnetic Resistor (GMR) cell 10'. This GMR cell 10' may be connected to a damper flap housing 9.

The GMR cell 10' itself is made of two very thin ferromagnetic layers 1, 2, and an additional also very thin layer 4 made of a non-ferro-magnetic material between said layers 1, 2. The ferro-magnetic layers are formed of thin iron laminate elements 1, 2 and a non-ferro-magnetic layer 4 located between them, made of a copper laminate element. The thickness of the individual layers 1, 2 and 4 is between 0.2 and 5 mm.

A magnet element 5 consisting of a north half N and a south half S is located underneath the GMR cell 10' at a gap distance 6. The gap distance 6 is between 2 and 3 mm. The magnet element 5 rotates around a rotor axis 7 and may be connected to a damper flap shaft 8 of a damper flap.

If the damper flap shaft 8 rotates in the damper flap housing, the magnet element 5 is moved in relation to the GMR cell 10' by a rotary motion R. When this occurs, a magnetic field flows in the corresponding direction through the two iron laminate elements 1, 2 with a magnetic field strength H. The spin of the free electrons in the iron laminated elements orients itself anti-parallel due to magnetic coupling. Due to the anti-parallel polarization of the spins, electron scatter occurs at the boundary layers of the iron laminate elements 1, 2. These electron movements result in an electrical resistance of the system. The resistance decreases if an external field overruns the self-generating magnetic field such that all electron spins are parallel polarized.

This causes the magnetic field with the field strength H in the individual iron laminate elements to create two flows I1, I2 in opposite directions.

In the end, an adjustable magnetic resistance R10, ... is generated that changes its resistance corresponding to the movement of the magnet element 5. This resistance R10, ... is arranged in a resistor network for generating an output voltage U.

Figure 2:
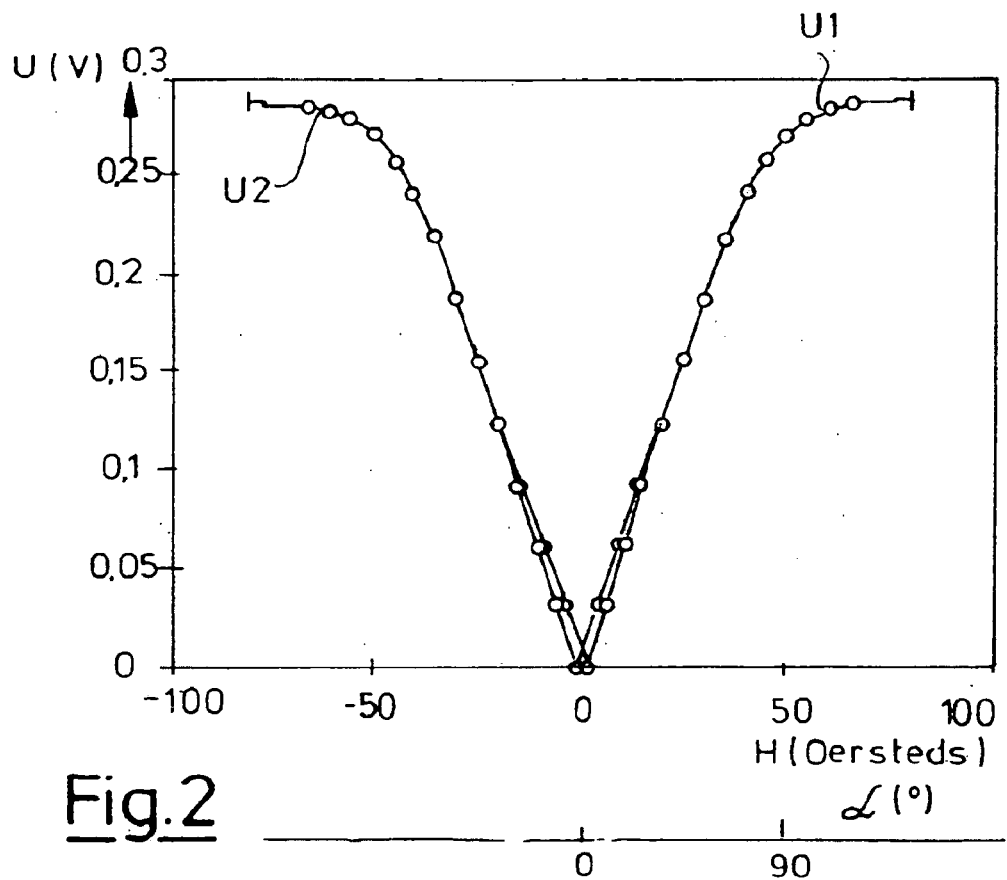
FIG. 2 shows a delivery voltage of a GMR rotation angle sensor with a GMR resistor according to FIG. 1.
Figure 3:
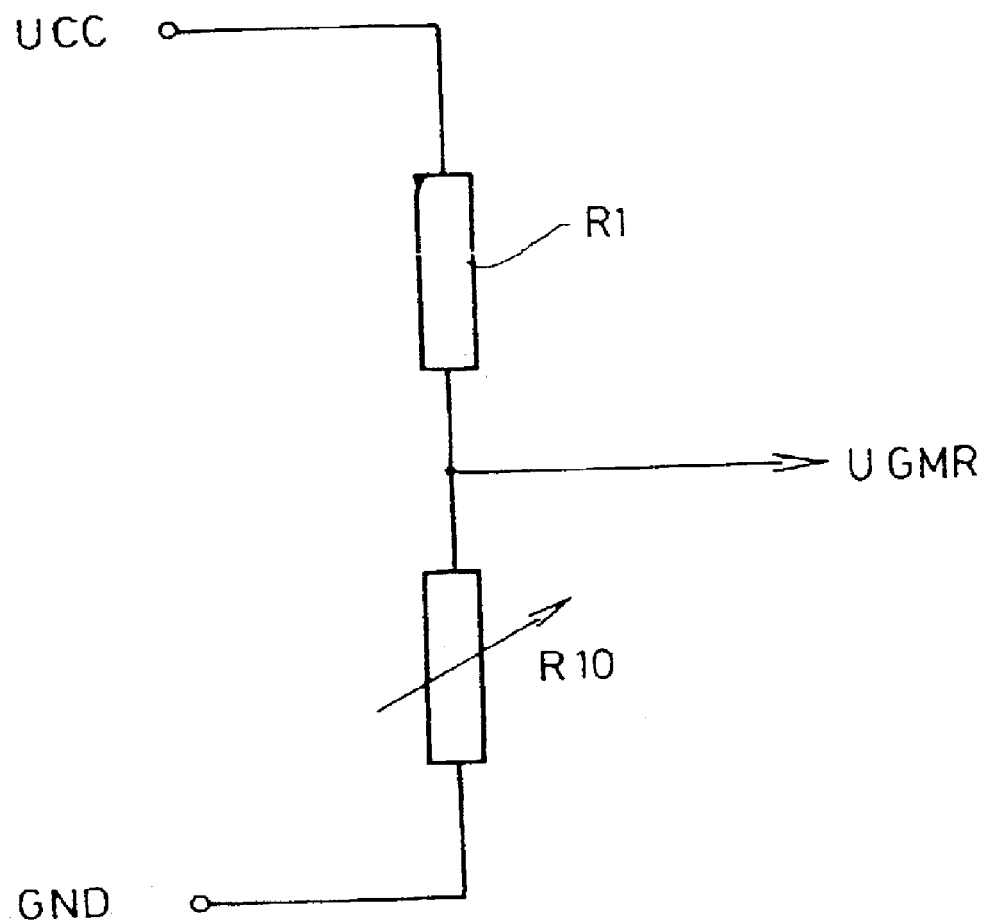
FIG. 3 shows a GMR sensor with a GMR cell arranged in a voltage divider circuit according to FIG. 1.

A voltage divider, as shown in FIG. 3 is such a resistor network. This voltage divider consists of a series circuit of a resistor R1 and the adjustable magnetic resistor R10. A supply voltage $U_{cc}$ of, for example, +5V is present at resistor R1 and GND at resistor R10. A GMR voltage $U_{GMR}$ that consists of two supply voltages U1, U2, and that is shown in FIG. 2 is supplied at the dividing point between R1 and R10.

The right branch, that is, the delivery voltage U1, is generated by the north portion N of the magnet element 5. The left, south block S of the magnet element 5, on the other hand, generates the left delivery voltage U2, which is located at a mirror image of U1. The presentation shows a V-shaped voltage configuration.

Both delivery voltages U1, U2 represent a certain angle á of the damper flap shaft 8 in relation to the damper flap housing. As FIG. 2 shows, an angle value can be assigned to the individual delivery voltage values. It is of particular advantage that two voltage profiles are generated that are up to 80% straight and that can be used for subsequent evaluations.

Figure 5:
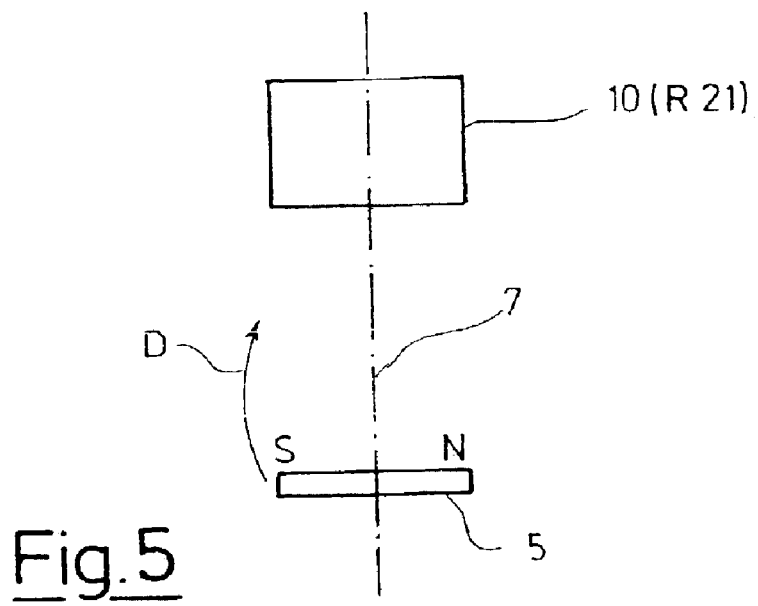
FIG. 5 shows a schematic view of a GMR resistor of a GMR rotation angle sensor according to FIG. 1.

As shown in FIGS. 1 and 5, a single resistor R10 with one GMR cell 10' is sufficient for a GMR resistor, where said resistor is part of a resistor network, which can be designed as a voltage divider, as explained in relation to FIG. 3. Since the GMR cell 10' is representative of the GMR resistor that is used to generate the output voltage $U_{GMR}$, the following will refer to the GMR cells without directly mentioning or explaining the network.

Figure 6:
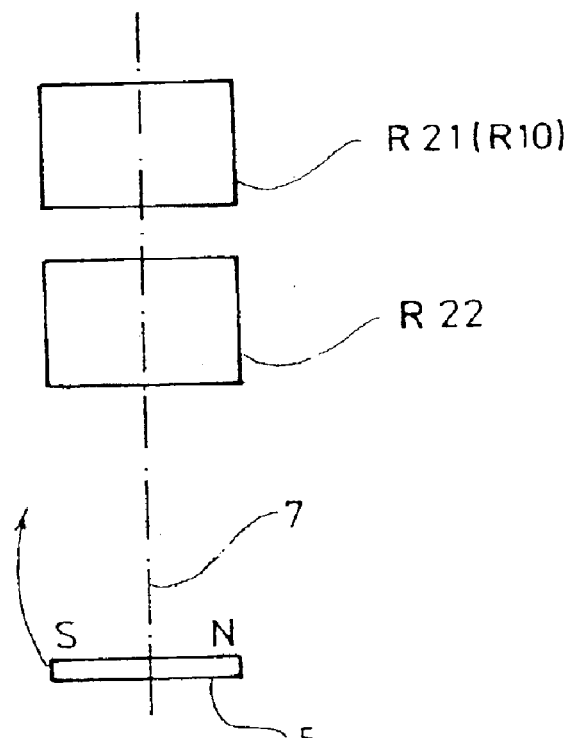
FIG. 6 shows a GMR resistor of a GMR rotation angle sensor according to FIG. 1 and FIG. 3 with a redundant GMR cell.

To create redundancy, an additional GMR cell may be assigned to the GMR cell R10 (cf. FIG. 6) The two cells may be arranged above one another, successively or next to one another. The magnet element can be positioned corresponding to this arrangement.

Figure 9A:
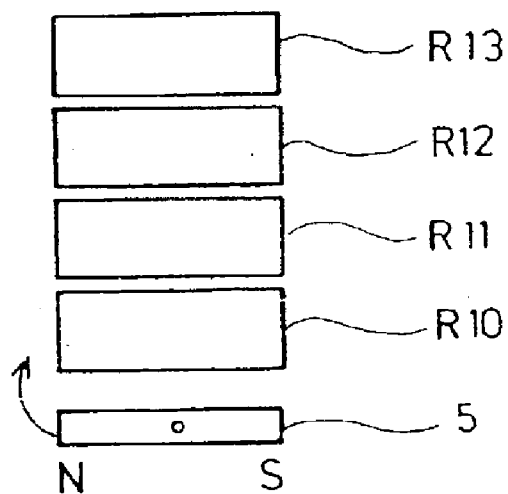

However, the GMR rotation angle sensor may also consist of 4 GMR cells R10, R11, R12, R13 that are arranged at 90° angles to one another and with the magnet element 5 moving in relation to them. These four GMR cells can be arranged in relation to one another as shown in the drawing. The respective degree value between them can also be achieved by positioning all four GMR cells one above another (cf. FIG. 9a).

Figure 8:
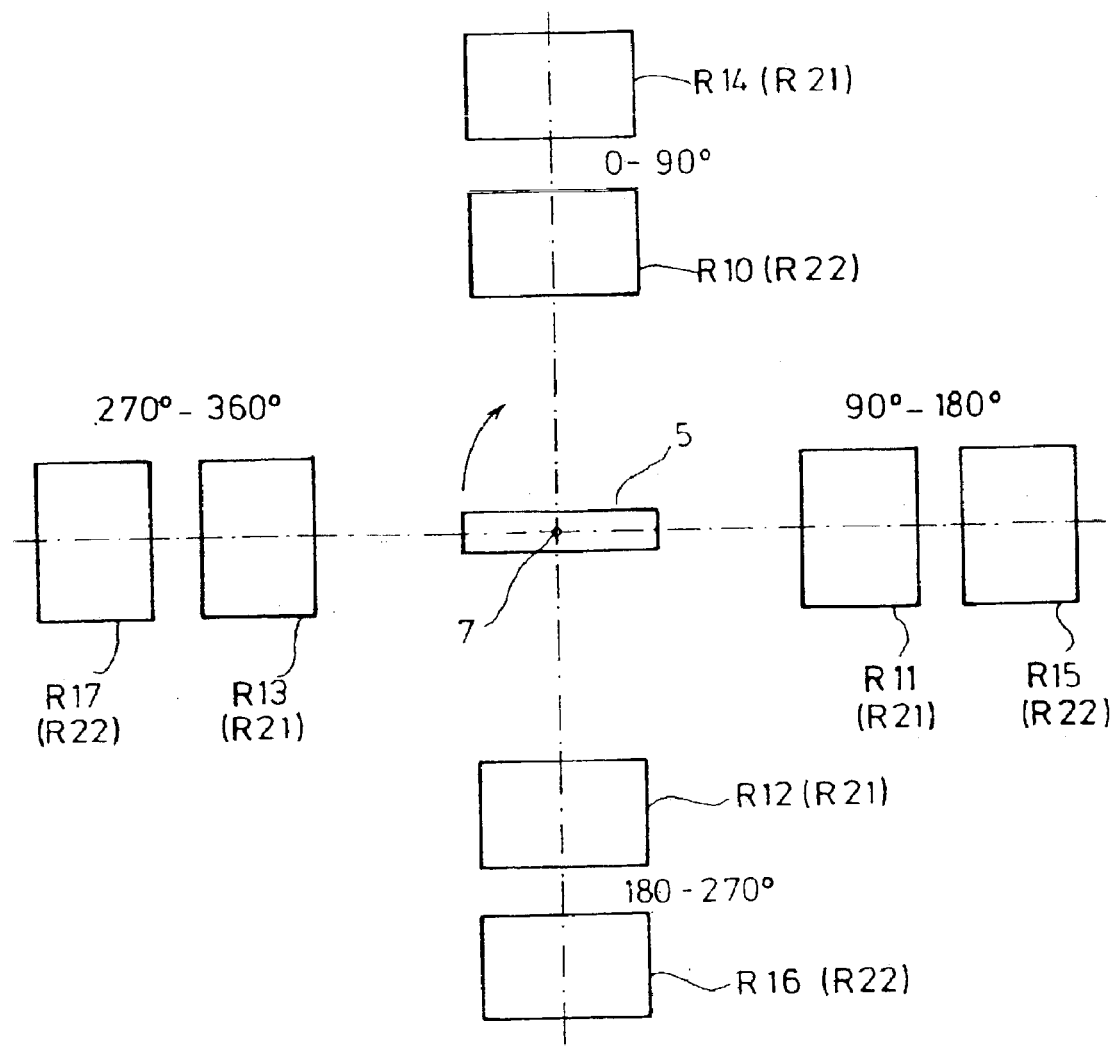
Figure 9B:
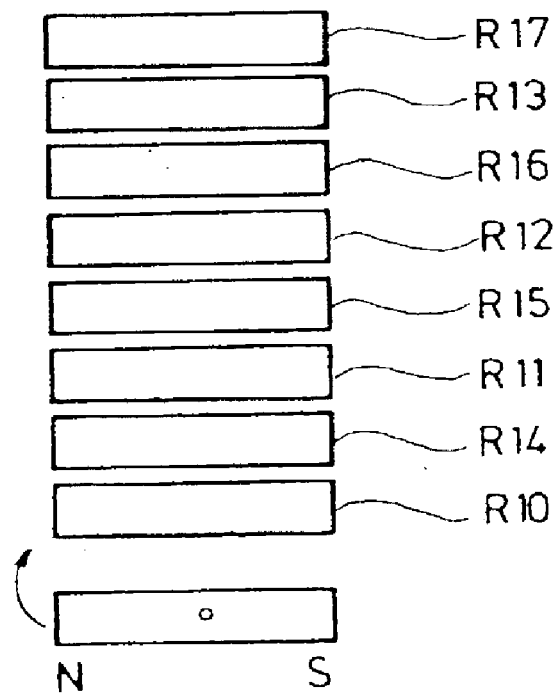

To create redundancy, four additional GMR cells R14, R15, R16, R17 may be assigned to the four GMR cells R10, ..., R13 (cf. FIG. 8). These eight GMR cells may also be positioned in the various planes to one another, i.e., successively, above one another (cf. FIG. 9b), next to one another and the like.

The objective of the GMR rotation angle sensor is, however, not only to generate the respective delivery voltages U1, U2 but also to regenerate output voltages with a precise angle value á being assigned to each voltage value.

Figure 10B:
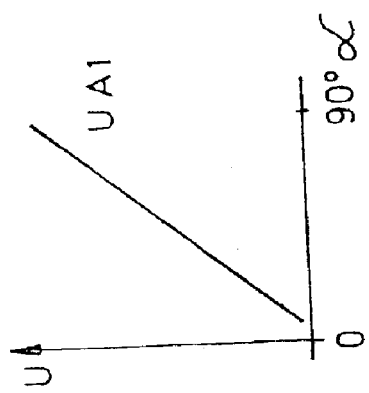
Figure 10A:
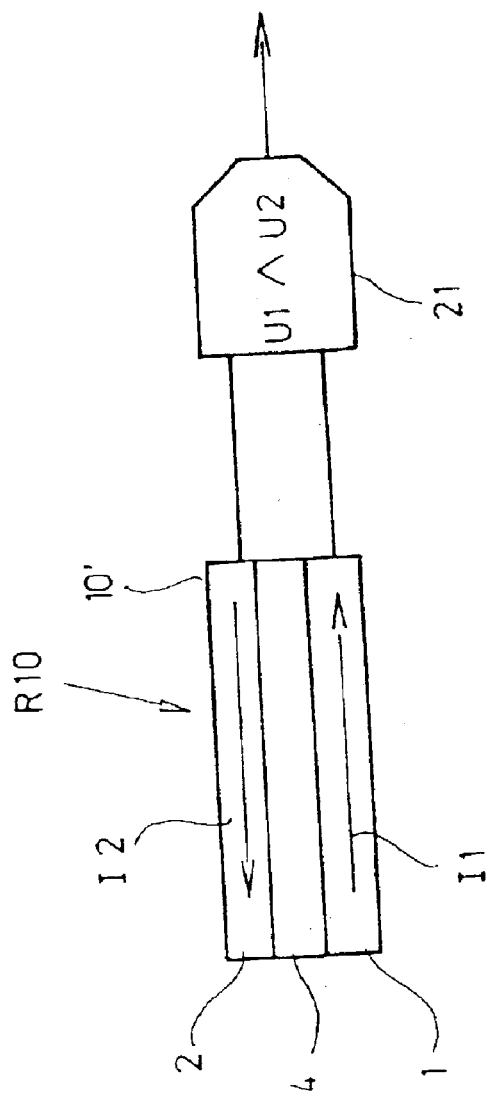
FIG. 10a shows a GMR rotation angle sensor according to FIG. 1 and FIG. 3 with a connected logic unit.

FIG. 10a illustrates this opportunity. Here, the GMR rotation angle sensor according to FIGS. 1 and 3 is amended by a logic unit 21. The logic unit 21 logically links the values of the two delivery voltages U1 and U2 such that a straight, i.e., a linear output voltage $U_{A1}$ is delivered from the rounded curves as shown in FIG. 10b. With program-technological means it is possible to modify the slope of the output voltage $U_{A1}$ such that it displays very accurate values for the respective application conditions.

The particular advantage of the circuit according to FIG. 10a is that one of the delivery voltages U1, U2 is used in order to straighten the other one and to give it the desired slope. This saves additional compensation units. The application costs are lowered due to this simple, yet very accurate, type of generation of a very straight output voltage $U_{A1}$.

Figure 4:
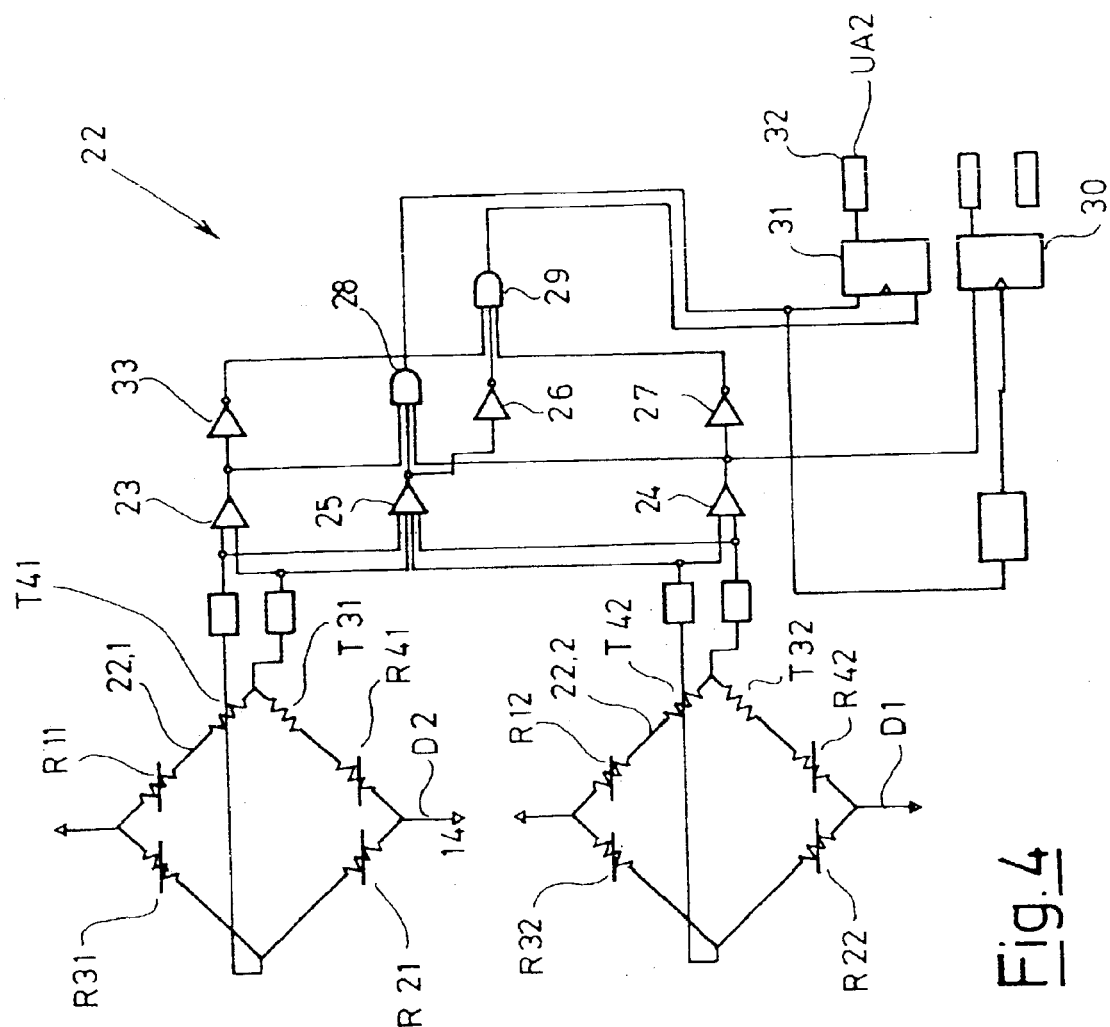
FIG. 4 shows two GMR rotation angle sensors according to FIG. 1 connected to a logic bridge unit.

A substantially more convenient resistor network is shown in FIG. 4. It consists of two full Wheatstone bridges 22.1, 22.2. The bridge resistors R11, R21, R31 and R41 build the bridge circuit 22.1. Resistor R21 of the Wheatstone bridge 22.1 can be designed as GMR resistor R10. The Wheatstone bridge 22.2 consists of the bridge resistors R12, R22, R32 and R42. Here, the resistor R22 can be designed as a GMR resistor. The Wheatstone bridge 22.1 generates the delivery voltages U1, U2 in a known manner through the rotation of one or two magnet elements 5. The terminals T31, T41 of the Wheatstone bridge 22.1 and the terminals T32, T42 of the Wheatstone bridge 22.2 are connected to the amplification elements 23, 24 and a multi-amplification element 25 via connection element V+ and V−. The output of the amplification elements 23, 24, 25 is connected both directly to the power amplifier 28 and to an AND gate 29 via the NOR gates 26, 27, 33. The output of the AND gate 28 and the output of the AND gate 29 are connected to a flip-flop 31, which is connected to an output terminal 32. The output of the AND gate 28 and the output of the amplification elements 23, 24 are connected to a flip-flop 30.

If the magnet element 5 moves in front of the two GMR cells 10, 14 that form the resistors R21, R22 (cf. FIG. 6), the delivery voltages U1, U2 generate a sum signal at the terminals T31, ..., T42, and said sum signal is output as an output voltage $U_{A2}$ by means of the amplification elements 23, 24, 25 and the NOR gates 26, 27, 33 using the flip-flop. A respectively configured output signal is regenerated through the comparison, or the differentiation, respectively, of the delivery voltages U1, U2 of the two GMR resistors.

It is possible that a magnetic field that flows through the GMR cells may be generated through a fixed magnet element in place of the moving magnet element. A shaft with an attached signal block or a gear wheel can rotate in front of the GMR cells and generate the respective delivery voltages through the changes of the magnetic field. The particular advantage of this type of signal processing is that a differential signal feathering is available. With it, it is possible to measure the revolutions of a rotating shaft or the like. In addition, the use of two Wheatstone bridges 22.1, 22.2 allows for the determination of the direction of rotation R as well as the position of the shaft 8.

Figure 11:
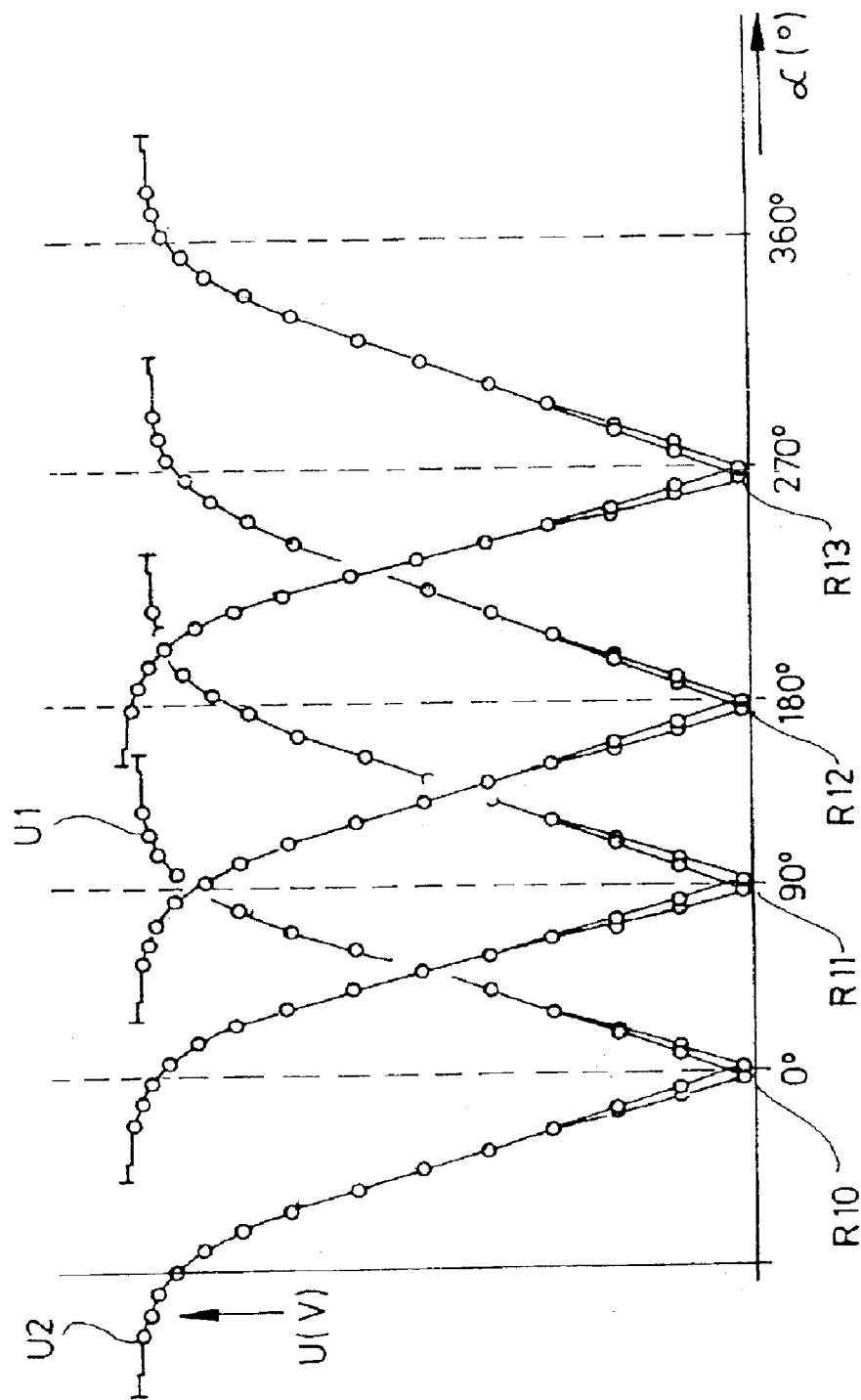
FIG. 11 shows delivery voltages that are supplied by the four GMR resistors according to FIG. 5 or 9, respectively.

FIG. 11 shows the output voltages of four GMR resistors.

Figure 7:
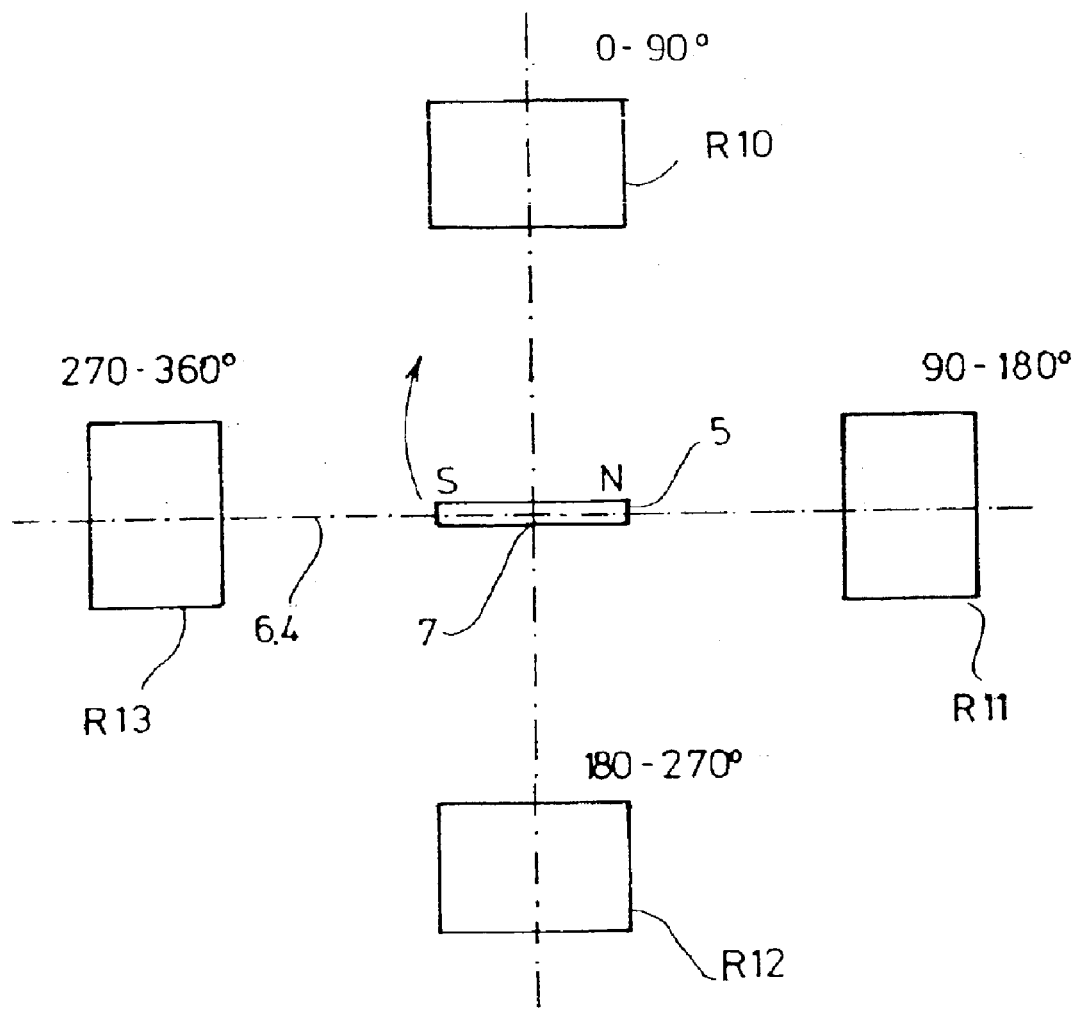
FIGS. 7 to 9b show schematic presentations of various variations of embodiments of GMR cells of a GMR rotation angle sensor.

The four GMR resistors R11, . . . , R14 are spatially arranged as shown in FIG. 7. The magnet element 5 rotates in the center of the four-GMR arrangements.

Figure 12A:
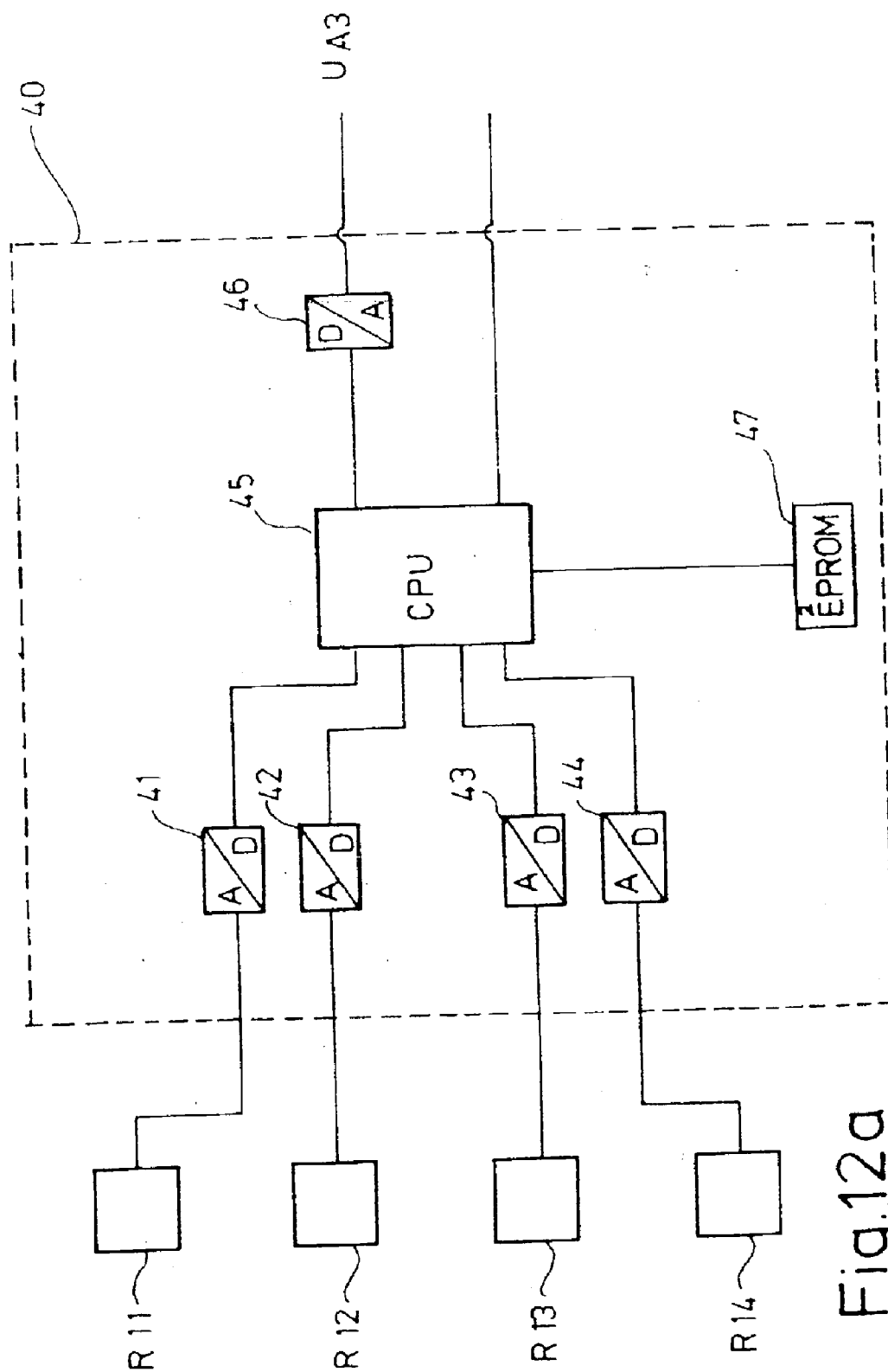
FIG. 12a shows four GMR cells according to FIG. 5 or 9, respectively, connected to a 360° logic unit.

As shown in FIG. 12a, these four GMR resistors R11, R12, R13, R14 are linked to a 360° logic unit 40. The GMR resistor R11 of a resistor network is connected to a CPU 45 via an AD converter 41, the GMR resistor R12 via an AD converter 42, the GMR resistor R13 via an AD converter 43 and the GMR resistor R14 via an AD converter 44 (cf. FIG. 12a). Connected to the CPU is a hard disk memory 47 that is designed as an E$^2$PROM. One of the outputs of the CPU 45 goes to the outside via a D/A converter, the other directly, such that an analog signal is present at the one output and a digital signal at the other output for a respective evaluation.

The operating program of the 360° logic device 14 is stored in the E$^2$PROM 47 and runs as follows:
a) Recording of the delivery voltages U1, U2 that are measured by the GMR resistors R11, R12, R13, R14;
b) Assigning the individual values of the delivery voltages U1, U2 to a position angle; and
c) Computing an output voltage $U_{A3}$ from the individual delivery voltages of the GMR resistors R11 to R14 and output of the output voltage $U_{A3}$.

If the magnet element 5 moves opposite the GMR cells of the GMR resistors R11, R12, R13, R14 according to FIG. 7, the delivery voltage profiles U1, U2 are generated for each GMR cell as shown in FIG. 11.

Figure 12B:
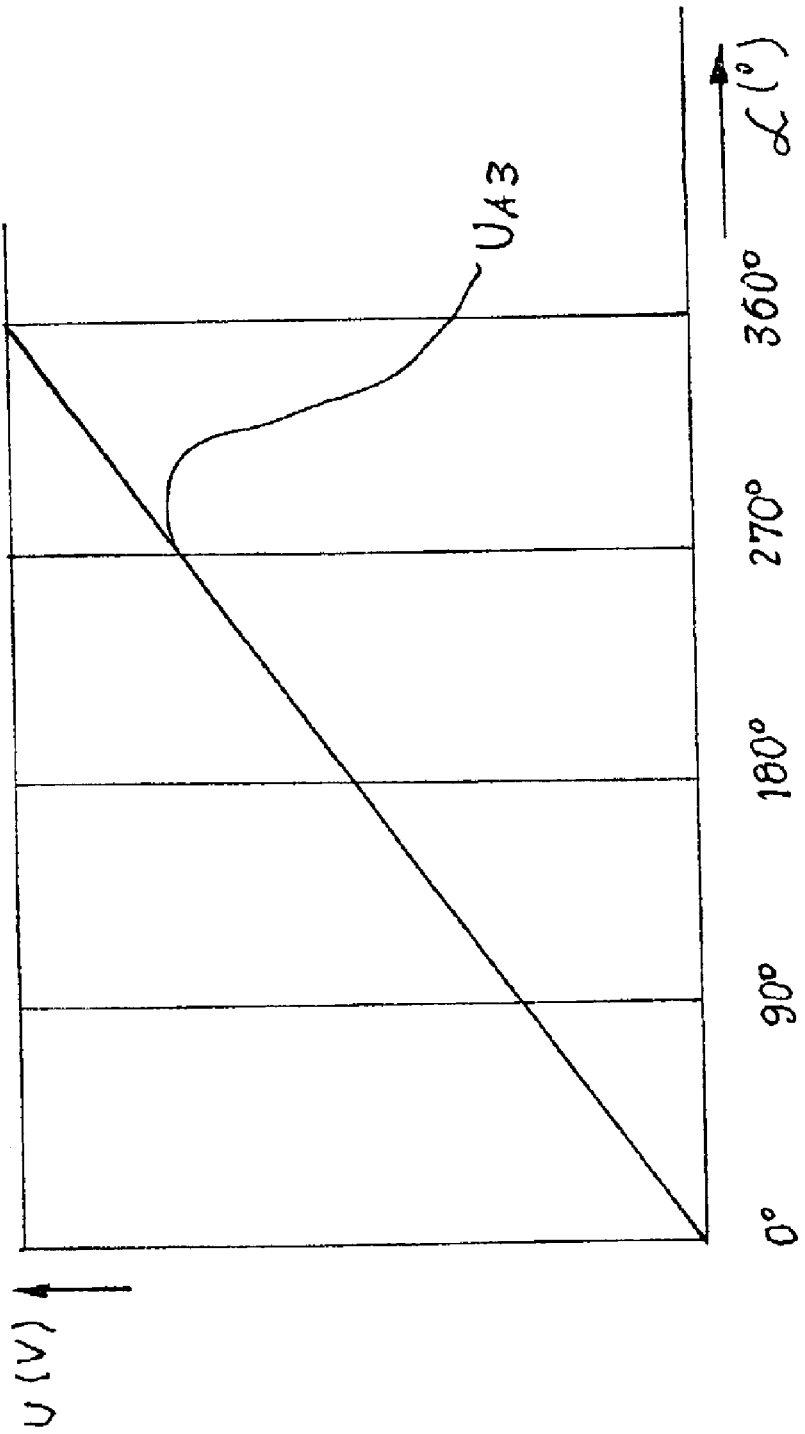
Figure 13:
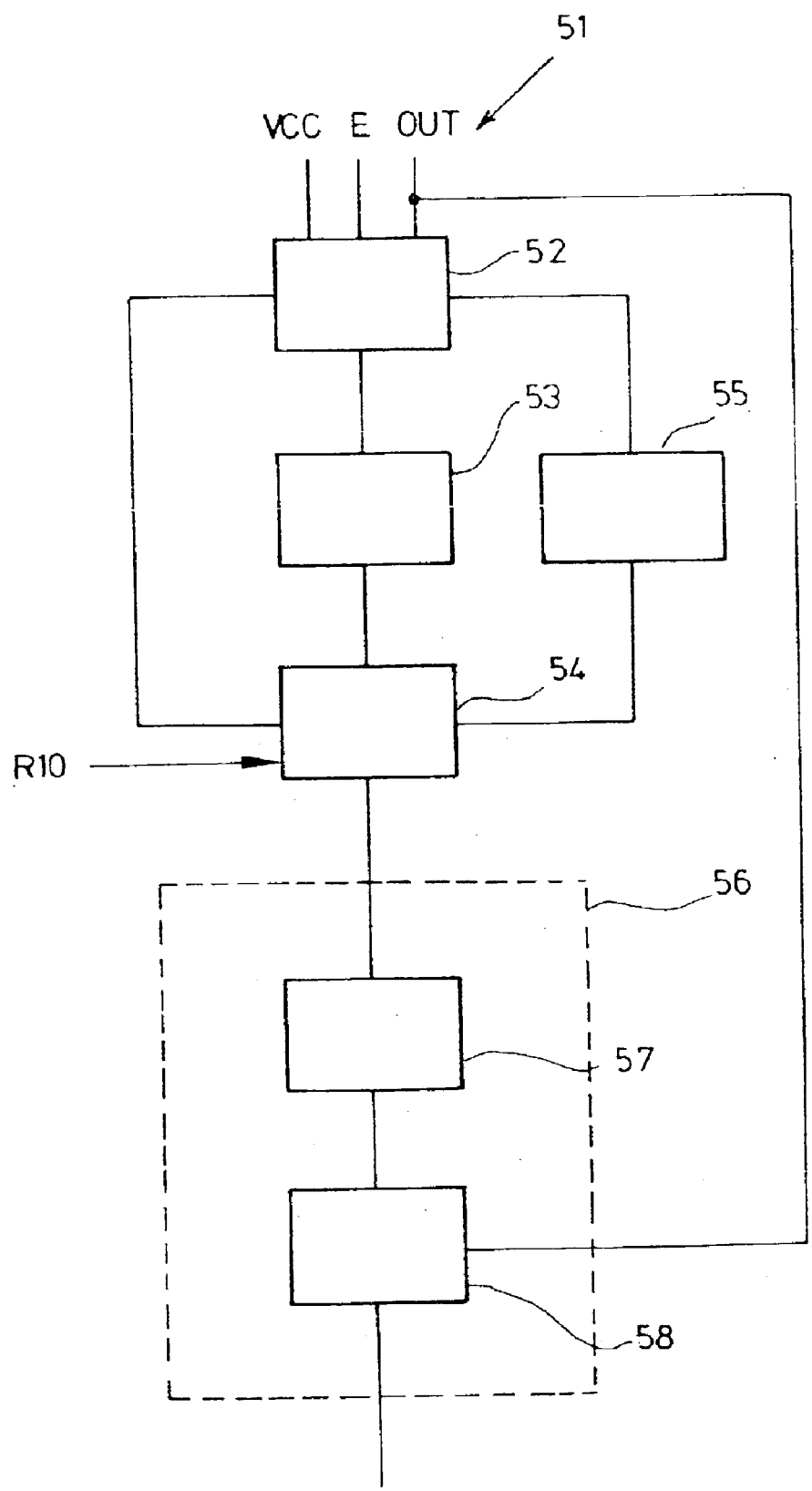
FIG. 13 shows a block circuit diagram of a PIN adjustment unit for GMR rotation angle sensors.

From the positive branch, the CPU 45 taps the straight line of the delivery voltage U1 of each GMR cell and adds them together such that the output voltage $U_{A3}$ is output in the shape of a straight line according to FIG. 12b. The shape of the output voltage $U_{A3}$ ensures that an accurate and precise value of the output voltage UA3 corresponds to each position between −180 and +180°.

The curve profiles shown in FIG. 11 show clearly that for the measurement of the rotary motion of the angle a between 0 and 360°, it is sufficient if the GMR cell 10 and the GMR cell 11 are installed, such that GMR cell 11 is offset by 90° to the GMR cell 10.

If the magnet element 5 rotates in front of these two GMR cells, the positive delivery voltage U1 of the GMR cell 10 is recorded for the rotation between 0 and 90° and from it the straight piece of the output voltage $U_{A3}$ between 0 and 90° is regenerated.

When rotating the magnet element between −180 and −90° the respective delivery branch of the GMR cell 10 is obtained, and at the continued rotation from −90 to 0°, the respective branch of the delivery voltage of the GMR cell 11 is obtained, and from the two, straight sections of the output voltage $U_{A3}$ between −180 and 0° are computed and output.

When the rotation continues from 90 to 180°, the straight signal profile between 90 and 180° of the output voltage $U_{A3}$ is generated from the positive branch U1 of the GMR cell 11 (cf. FIG. 12b).

The output voltage UA3 is not limited to the straight line shown in FIG. 12b. It can be output as a saw tooth curve as well, as shown in FIG. 12c. To this end, program-technological changes of the operating program in memory 47 need to be carried out. The rising flanks between 0 and 90°, 90 and 180°, etc. can be output as corresponding negative flanks as well.

FIGS. 13 to 16 show a PIN adjustment unit 51 that allows for the possibility of making adjustments to the output voltage of an already enclosed GMR resistor.

The PIN adjustment unit 51 consists of the series circuit of a modification unit 52, a permanent memory 53, an operating unit 54 and an output device 56. A temporary memory 55 that is connected to the modification unit 52 and the operating unit 54 is arranged parallel to the permanent memory 53. In addition, the modification unit 52 is connected directly to the operating unit 54. The operating unit 54 is located at a GMR resistor R10, . . . with the GMR cell 10, . . . .

The output device 56 consists of a series circuit of a signal converter unit 57 and an output unit 58.

A connector strip that includes at least a voltage pin $V_{CC}$, a ground pin E and an output pin OUT is located at the modification unit 52. The output pin OUT is connected to the output unit 58. The modification unit is a digital arithmetic unit or a slide-in computer with a central processing unit with an inscribed adjustment program and operating program.

Figure 14:
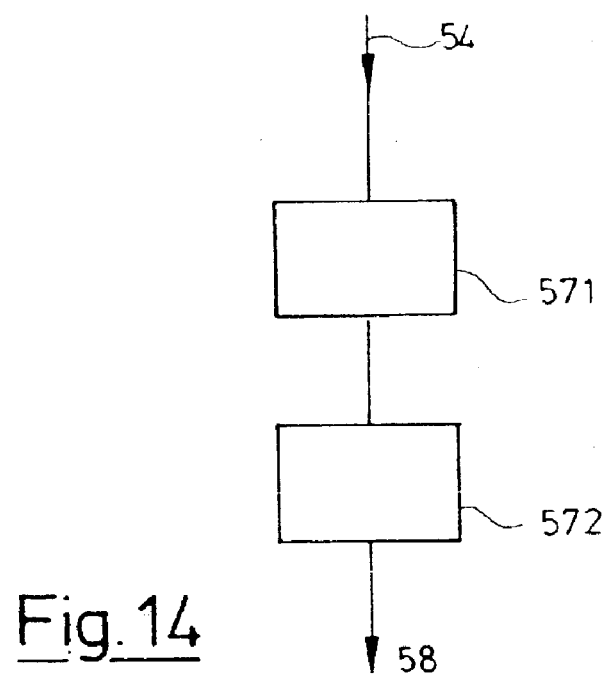
FIG. 14 shows a signal converter unit of a PIN adjustment unit according to FIG. 13.

According to FIG. 14, the signal converter unit 57 consists of a series circuit of a digital/analog converter 571 and an amplifier 572.

Figure 15:
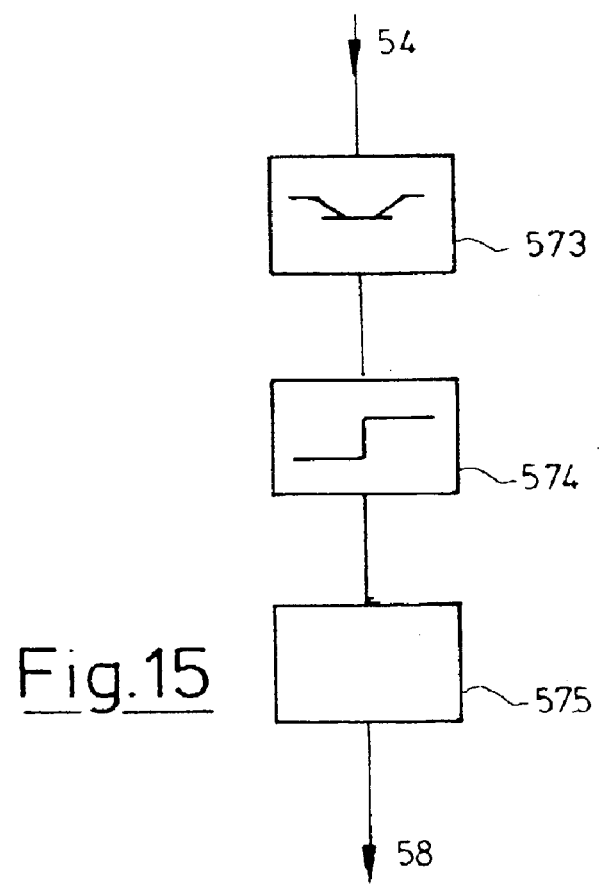
FIG. 15 shows another embodiment of a delivery device of a PIN adjustment unit.

A different design of the signal converter unit 57 is presented in FIG. 15 and consists of a series circuit of an opto-coppler 573, a reference voltage element 574 and a comparator 575.

Figure 16:
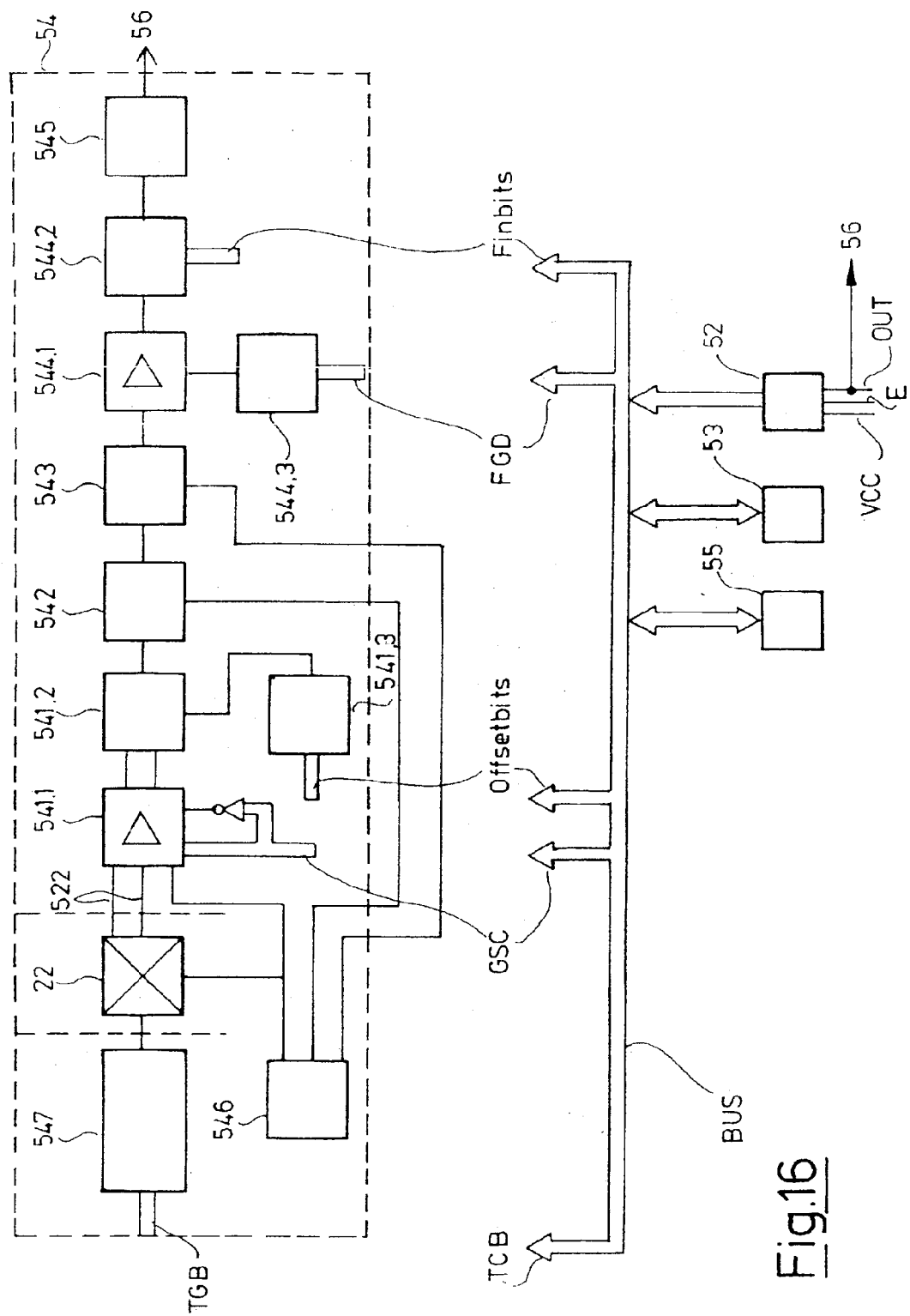
FIG. 16 shows an operating unit of a PIN adjustment unit according to FIG. 13.

FIG. 16 shows a block circuit diagram of the operating unit 54. Located opposite to it are the modification unit 52, the permanent memory 53 and the temporary memory 55. The continued processing of the output device 56 is indicated by an error.

Located opposite to the voltage source with temperature compensation 547 are in sequence the following components:

a pre-amplifier 541.1
an offset amplifier 541.2 that is connected to an offset digital/analog converter
a switched capacitor stage 542
a sample & hold unit 543
an amplifier 544.1 that is connected to a gain-bit digital/analog converter
a characteristics limiter 544.2, and
a power amplifier 545.

The switched capacitor stage 542 is used for automatic compensation of the offset of the respective GMR cell.

The sample & hold unit 543 assumes the task of interim storage of the voltage values during the generation of the subsequent value.

The operating unit 54 includes a clock generator 546 that is connected to the GMR cell, the pre-amplifier 541.1, the switched capacitor stage 542 and the sample & hold unit 543.

The modification unit 52, the permanent memory and the temporary memory 55 are connected to the bus system bus. As is generally known, the bus system bus includes a data address bus and a control bus. In this specific case, however, it is only a data bus.

A coarse adjustment level GSC that leads to the pre-amplifier 541.1 branches off from the bus system bus.

Located next to it is a branch-off of coarse bits—offset bits that leads to the offset digital/analog converter 541.3

In addition, a branch fine adjustment level FGB leads from the bus system bus to the Gain bits digital/analog converter. Located next to it is a branch fine bits/fine bit that leads to the characteristics limiter 544.2.

The coarse adjustment level GSC with the coarse bits offset bits is a coarse adjustment setting. On the other hand, the fine adjustment level FGB located next to it, with the characteristically limiting bits fin bits, constitutes a fine adjustment setting.

Furthermore, the bus system BUS may include a branch-off temperature coefficient bits TCB that can be used to control the temperature gradient of the voltage source 547, for example, from the modification unit 52.

To adjust the delivery voltage U1, U2, adjustment data are entered into the temporary memory 55 via the output pin OUT and the modification unit 52. To this end, first the coarse adjustment is carried out with the coarse adjustment level GSC between 2 and 4 bits, e.g., 3 bits and the coarse bits offset bits between 8 and 15 bits, e.g., 10 bits, and then the fine adjustment is carried out with the fine adjustment level FGP between 7 and 14 bits, e.g., 9 bits, and the characteristics limitation bits fin-bits between 1 and 4 bits, e.g., 2 bits. The modification unit ensures that these data for the coarse and fine adjustment settings are called from the temporary memory 55.

By entering adjustment data, one of the delivery voltages U1, U2 is raised or sloped such that it assumes the desired profile.

If the evaluation of the adjustment according to this protocol results in the fact that the delivery voltage corresponds to the nominal line, its adjustment data will be written from the temporary memory 55 into the permanent memory 53 by the modification unit 53. The permanent memory 53 is a ROM memory, a PROM memory, an E²PROM memory or any other read only memory, while the temporary memory 55 is a RAM memory or a similarly designed write/read memory.

The GMR rotation angle sensor that is adjusted in the PIN adjustment unit 51 taps during the running operation the large bits offset bits and fine bits fine bits that are written into the permanent memory as adjustment data. In particular the offset amplifier 541.2, the switched-capacitor stage 542 and the sample & hold unit 543, as well as the characteristics limiter 544.2 ensure that the entered bits are converted to a constant voltage level and are continuously added to the delivered delivery voltage.

Figure 17B:
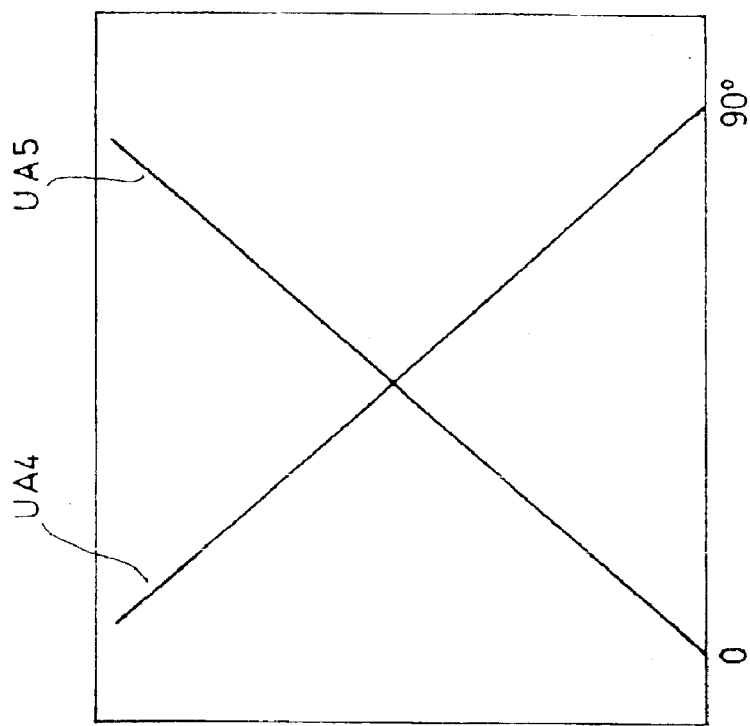
FIG. 17b shows the delivery voltages adjusted by the PIN adjustment unit according to FIGS. 13 to 16 in relation to the adjusted output voltages.
Figure 17A:
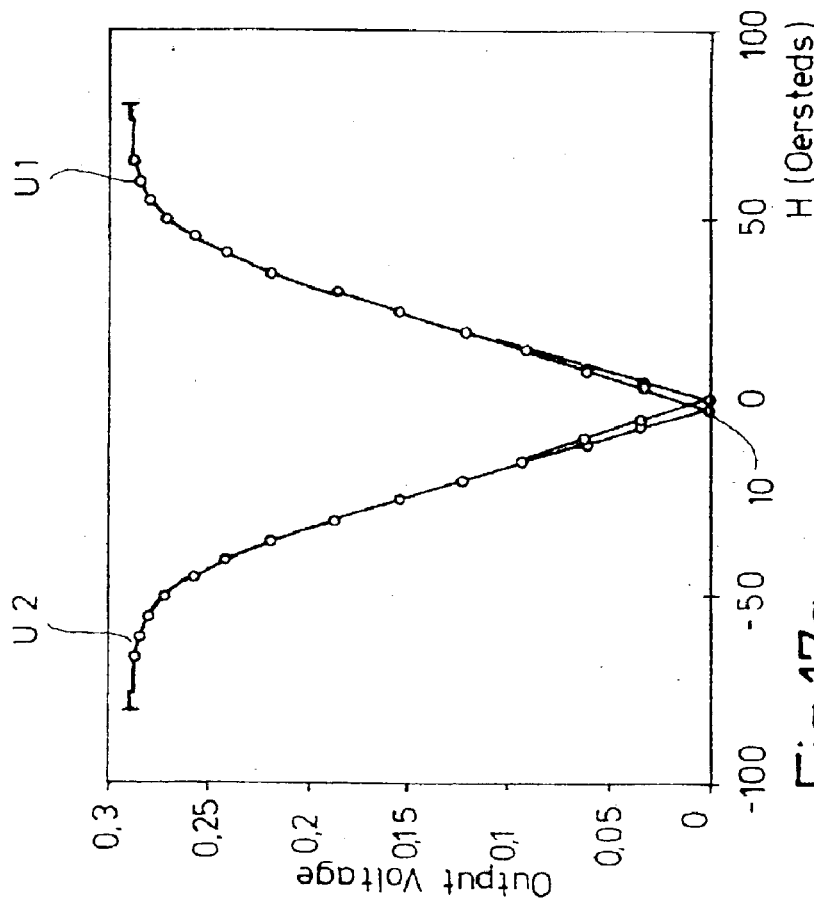
FIG. 17a shows delivery voltages of a GMR rotation angle sensor as have already been presented in FIG. 2.

FIGS. 17a to 17c show how output voltages that exhibit various slopes can be regenerated from the two delivery voltages U1 and U2.

With the aid of the PIN adjustment unit 51 and the completed adjustment, the delivery voltage U1 is regenerated to the output voltage $U_{A5}$. On the other hand, the delivery voltage $U_{A4}$, which runs in the direction opposite to the delivery voltage $U_{A5}$, is regenerated from the delivery voltage U2. Both curves can be created by the actuation of an accelerator pedal or a damper flap. The two output voltages can be used for detecting errors in the supply lines, at the supply voltage or for detecting the presence of individual errors. Due to the fact that both output voltages $U_{A4}$, $U_{A5}$ exhibit steep slopes, error detection is still valid even in the area of intersection of the two characteristics when the resulting value between the two characteristics shall be evaluated as the output signal.

The GMR rotation angle sensor subject to the invention is not limited to monitoring the accelerator pedal and its supply or to monitoring the damper flap and its supply. In fact, all other parts in a vehicle can be monitored effectively.

Through the PIN adjustment unit 52 it is also possible to convert the two delivery voltages U1 and U2 into output voltages $U_{A6}$ and $U_{A7}$ (cf. FIG. 17c) that have a linear profile and exhibit different slopes between a lower and an upper maximum value. The very straight and strong signal profiles allow for taking up the monitoring tasks that are required and necessary for the continued improvement of the operational reliability of the supply systems very effectively.

For example, if the voltage supply for the accelerator pedal or the damper flap is broken down or interrupted, this failure is determined based on the two different profiles of the output voltages $U_{A6}$ and $U_{A7}$ and based on a plausibility comparison, the result is supplied to an evaluation unit and corresponding messages are carried out. The respective measures for remedying the errors can than be initiated based on these messages.

There has thus been shown and described a novel GMR rotation angle sensor and device for generating output voltages which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for generating output voltages, that can be used to determine the position of two components that are moving in relation to one another, comprising:
    (a) at least one adjustable Giant Magnetic Resistor (GMR) resistor with a Giant Magnetic Resistor cell assigned to a first component;
    (b) at least one magnet element movable relative to said GMR cell in at least one gap and assigned to a second component; and
    an evaluation unit coupled to the GMR resistor;
    wherein at least two of the GMR resistors are arranged in at least two resistor networks, each with at least one GMR resistor, and wherein said resistor networks are connected to a 360° logic unit serving as said evaluation unit, and wherein the 360° logic unit receives the delivery voltages $U_{GMR}$, U1 and U2, generated by the GMR resistors, and computes the actual position angle for 0 to 360° from the delivery voltages, and outputs said position angle as a third output.

2. A device as set forth in claim 1, further comprising four networks, each with at least one GMR resistor, connected to the 360° logic unit.

3. A device for generating output voltages, which represent the position of components that are moving relative to one another, said device comprising
    a) at least one adjustable Giant Magnetic Resistor (GMR) resistor with a Giant Magnetic Resistor (GMR) cell and at least one magnet element at a gap distance from said GMR, moving relative to said GMR cell, and wherein the GMR resistor is arranged in at least one resistor network; and
    b) an evaluation unit, wherein the at least one resistor network with a GMR resistor is connected to at least one PIN adjustment unit serving as said evaluation unit;
    wherein adjustment data, selected from the group consisting of: course bits (GSC), offset bits (FB) and fine bits, are stored temporarily in a temporary memory via an output pin and a modification unit, and modified output voltages $U_{A4}$ and $U_{A5}$, with slopes in opposite directions are output to an operation unit via a delivery device, whereby the adjustment data are then written to a permanent memory by the modification unit when the fourth and the fifth output voltage $U_{A4}$ and $U_{A5}$ have reached their adjustment position.

4. A device for generating output voltages, which represent the position of components that are moving relative to one another, said device comprising:

a) at least one adjustable Giant Magnetic Resistor (GMR) resistor with a Giant Magnetic Resistor (GMR cell), and at least one magnet element at a gap distance from said GMR cell, moving relative to said GMR cell, and wherein the GMR resistor is arranged in at least one resistor network ; and b) an evaluation unit, wherein at least one resistor network with a GMR resistor is connected to at least one PIN adjustment unit serving as said evaluation unit;

wherein adjustment data are stored temporarily in a temporary memory via an output PIN OUT and a modification unit; and a sixth and a seventh output voltage, UA6 and UA7 are output to an operation unit via a delivery device, and said output voltages are substantially linear between two extreme points and exhibit a deviating slope, whereby the adjustment data are then written to a permanent memory by the modification unit when the sixth and the seventh output voltages have reached their adjustment position.

5. A device as set forth in claim 4, wherein one PIN adjustment unit is assigned to each GMR resistor.

6. A device as set forth in claim 4, wherein two GMR cells are connected to a PIN adjustment unit.

7. A device as set forth in claim 1, wherein the resistor network is designed as a voltage divider comprising the series circuit of a resistor and a GMR resistor with a tap for the output voltage, located between them.

8. A device as set for the in claim 1, wherein the resistor network is designed as at least one Wheatstone bridge, wherein at least one the bridge resistors is an adjustable GMR resistor.

9. A device as set forth in claim 8, wherein two terminals of a first and second Wheatstone bridge are connected to the inputs of a first and a second amplification element and the inputs of a multi-amplification element via the two elements of the two terminals;

wherein the outputs of the first and the second amplification element and the multi-amplification element are connected to a first AND stage as well as through an associated NOR stage to a second AND stage; and wherein an output of each of the first and the second AND stages is connected to a first flip-flop and a second output voltage UA2 is output at an output terminal of said first flip-flop.

10. A device as in claim 9, wherein the output of the first AND stage and the output of the second amplification element are connected to a second flip-flop.

* * * * *